US008503309B2

(12) United States Patent
Vasseur et al.

(10) Patent No.: US 8,503,309 B2
(45) Date of Patent: Aug. 6, 2013

(54) DYNAMIC EXPELLING OF CHILD NODES IN DIRECTED ACYCLIC GRAPHS IN A COMPUTER NETWORK

(75) Inventors: Jean-Philippe Vasseur, Saint Martin d'Uriage (FR); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 289 days.

(21) Appl. No.: 12/971,422

(22) Filed: Dec. 17, 2010

(65) Prior Publication Data
US 2012/0155276 A1 Jun. 21, 2012

(51) Int. Cl.
*H04L 45/00* (2006.01)

(52) U.S. Cl.
USPC .......................................................... 370/237

(58) Field of Classification Search
None
See application file for complete search history.

(56) References Cited

U.S. PATENT DOCUMENTS

| | | | |
|---|---|---|---|
| 6,625,121 B1 | 9/2003 | Lau et al. | |
| 7,333,437 B1 | 2/2008 | Glick | |
| 7,372,814 B1* | 5/2008 | Chiruvolu et al. | 370/235 |
| 7,401,160 B2 | 7/2008 | Johnson et al. | |
| 7,477,646 B1 | 1/2009 | Peterson et al. | |
| 7,760,692 B2 | 7/2010 | Chen et al. | |
| 7,813,385 B1 | 10/2010 | Hyun et al. | |
| 7,844,057 B2 | 11/2010 | Meier et al. | |
| 8,081,566 B1* | 12/2011 | Ashwood-Smith et al. | 370/230 |
| 2004/0246901 A1* | 12/2004 | Zhang et al. | 370/238 |
| 2006/0067247 A1* | 3/2006 | Rajan | 370/254 |
| 2006/0291404 A1* | 12/2006 | Thubert et al. | 370/254 |
| 2007/0091811 A1* | 4/2007 | Thubert et al. | 370/238 |
| 2007/0183334 A1* | 8/2007 | White et al. | 370/238 |
| 2008/0186864 A1* | 8/2008 | Ho | 370/238 |
| 2009/0034434 A1* | 2/2009 | Tsang et al. | 370/256 |
| 2009/0271864 A1 | 10/2009 | Dietrich et al. | |
| 2009/0290511 A1* | 11/2009 | Budampati et al. | 370/254 |
| 2010/0061272 A1* | 3/2010 | Veillette | 370/254 |
| 2010/0091823 A1* | 4/2010 | Retana et al. | 375/211 |
| 2011/0116389 A1* | 5/2011 | Tao et al. | 370/252 |
| 2011/0176416 A1* | 7/2011 | Bhatti et al. | 370/230 |

OTHER PUBLICATIONS

Thubert, "RPL Objective Function 0,", <draft-ietf-roll-of0-03>, Jul. 29, 2010 version.

(Continued)

*Primary Examiner* — Derrick Ferris
*Assistant Examiner* — Irma Wahlstrom
(74) *Attorney, Agent, or Firm* — Edwards Wildman Palmer LLP; James M. Behmke; Stephen D. LeBarron

(57) ABSTRACT

A parent node in a directed acyclic graph (DAG) in a computer network may detect congestion from its child nodes. In response, the parent node may determine particular child nodes to expel from the parent node based on the congestion, and notifies the expelled child nodes that they must detach from the parent node in response to dynamically detecting congestion (e.g., to find a new parent, excluding the parent node and optionally any nodes in the vicinity). In another embodiment, a child node receives a detach request packet from a current parent node that indicates that the child node is expelled from using the current parent node. In response, the child node triggers a new parent selection to select a new parent node that specifically excludes the current parent node (e.g., and optionally any nodes in the parent's vicinity).

24 Claims, 12 Drawing Sheets

OTHER PUBLICATIONS

Vasseur et al., "Routing Metrics Used for Path Calculation in Low Power and Lossy Networks," <draft-ietf-roll-routing-metrics-12>, Nov. 10, 2010 version.

Winter et al., "RPL: IPv6 Routing Protocol for Low Power and Lossy Networks," <draft-ietf-roll-rpl-15>, Nov. 11, 2010 version.

* cited by examiner

DYNAMIC EXPELLING OF CHILD NODES IN DIRECTED ACYCLIC GRAPHS IN A COMPUTER NETWORK

TECHNICAL FIELD

The present disclosure relates generally to computer networks, and, more particularly, to directed acyclic graph (DAG) routing and management, e.g., in response to congestion.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

LLNs are often non-synchronized systems that are based on the assumption that nodes are free to transmit (after carrier sensing) when they have data to transmit without any synchronization. One of the major issue in LLNs, especially on non-synchronized shared media links (e.g., wireless links, etc.) is link congestion: not only is the bandwidth very limited, but it is well-known that the efficiency of data transmission collapses once the offered load exceeds some known limit. Thus congestion may lead to link collapse. Current approaches generally involve increasing the bandwidth on the links close to the congestion points (e.g., at/near directed acyclic graph or "DAG" roots), such as adding links, supporting multiple frequencies, etc., or performing load balancing on the traffic across a set of links across multiple (e.g., diverse) paths, among other techniques. These alternatives are directed at minimizing the risk of congestion, however there is no solution to handle the congestion once it occurs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
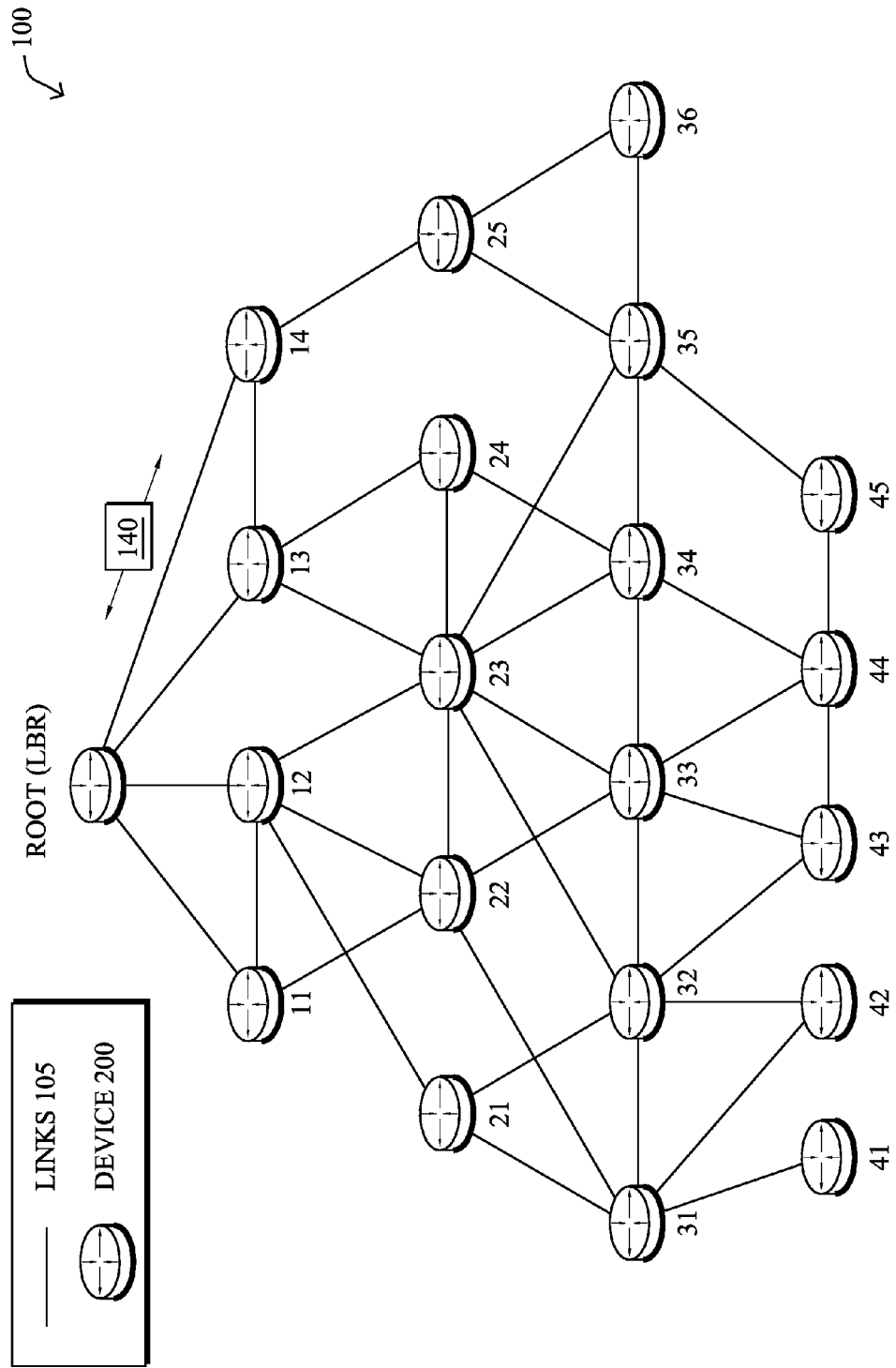
FIG. 1 illustrates an example computer network.

According to one or more embodiments of the disclosure, a parent node in a directed acyclic graph (DAG) in a computer network may detect congestion due to traffic from its child nodes. In response, the parent node may determine one or more particular child nodes to expel from the parent node based on the congestion, and notifies the expelled child nodes that they must detach from the parent node in response to the congestion (e.g., to find a new parent, excluding the parent node and optionally any nodes in the vicinity of the parent node).

According to one or more additional embodiments of the disclosure, a child node receives a detach request packet from a current parent node that indicates that the child node is expelled from using the current parent node. In response, the child node triggers a new parent selection to select a new parent node that specifically excludes the current parent node (e.g., and optionally any nodes in the vicinity of the parent node).

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC), and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data, along with routing/relaying data from other sensors, to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers, such as alarm messages. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network 100 illustratively comprising nodes/devices 200 (e.g., labeled as shown, "Root," "11," "12," . . . "44," "45") interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, while the embodiments are shown herein with reference to a generally "tree" shaped network, the description herein is not so limited, and may be applied to networks that have branches emitting to all directions from with the root node generally centralized among a plurality of surrounding nodes Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate. In this context, a protocol consists of a set of rules defining how the nodes interact with each other.

Figure 2:
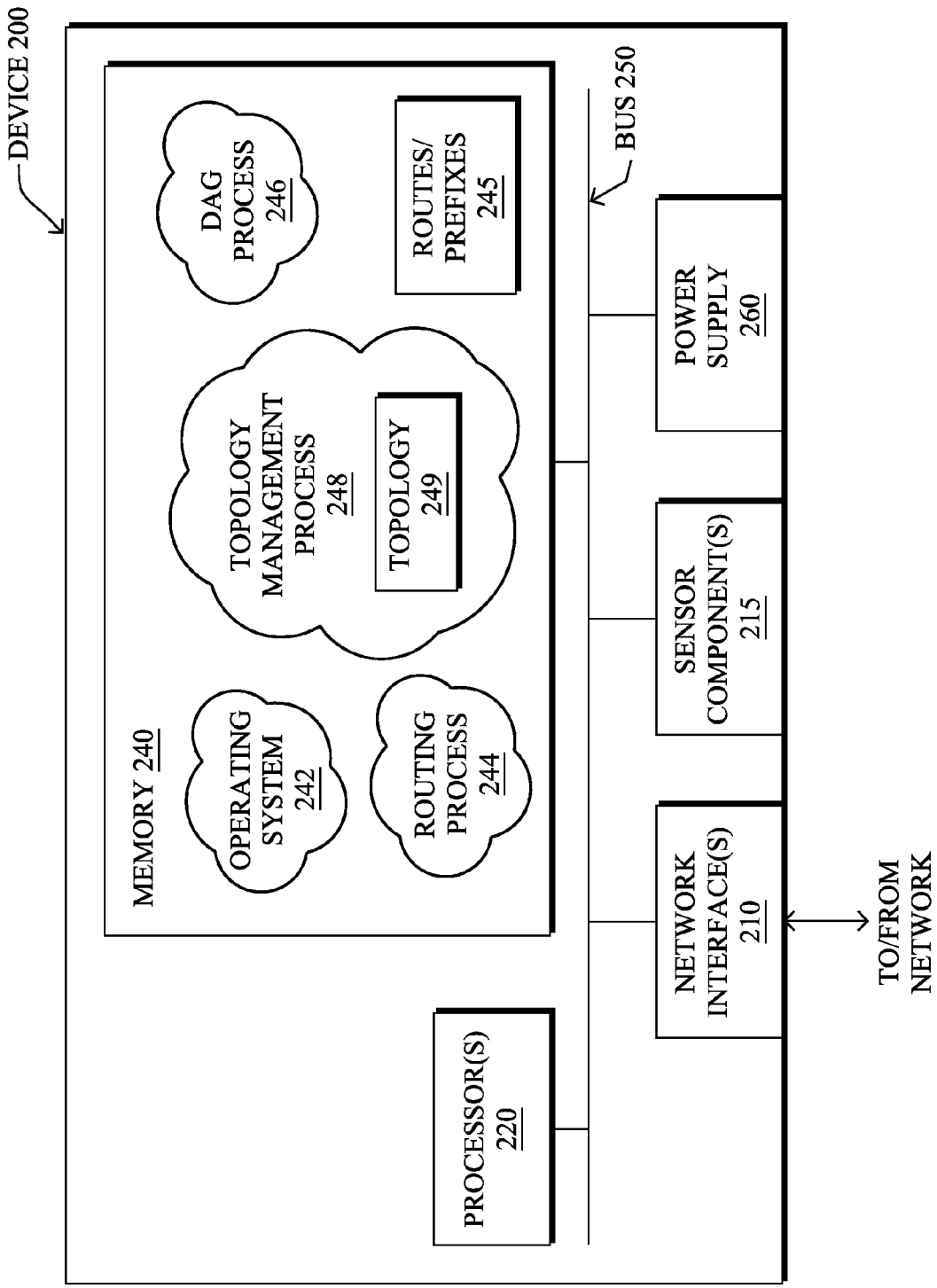
FIG. 2 illustrates an example network device/node.

FIG. 2 is a schematic block diagram of an example node/device 200 that may be used with one or more embodiments described herein, e.g., as nodes 11-45 and ROOT. The device may comprise one or more network interfaces 210 (e.g., wireless), an optional sensor component (e.g., for sensor network devices), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100 (e.g., wirelessly). The network interfaces may be configured to transmit and/or receive data using a variety of different communication protocols, particularly wireless protocols as noted above and as will be understood by those skilled in the art. Note, further, that the nodes may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures, such as routes or prefixes 245 (notably on capable devices only). An operating system 242, portions of which are typically resident in memory 240 and executed by the processor, functionally organizes the device by, inter alia, invoking operations in support of software processes and/or services executing on the device. These software processes and/or services may comprise routing process/services 244, which may include an illustrative directed acyclic graph (DAG) process 246. Also, for root devices (or other management devices), a topology management process 248 and associated stored topologies 249 may also be present in memory 240, for use as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-15> by Winter, at al. (Nov. 11, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-12> by Vasseur, et al. (Nov. 10, 2010 version). Further, an example OF (e.g., a default OF) may be found in an IETF Internet Draft, entitled "RPL Objective Function 0" <draft-ietf-roll-of0-03> by Thubert (Jul. 29, 2010 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination is information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state.

Figure 3:
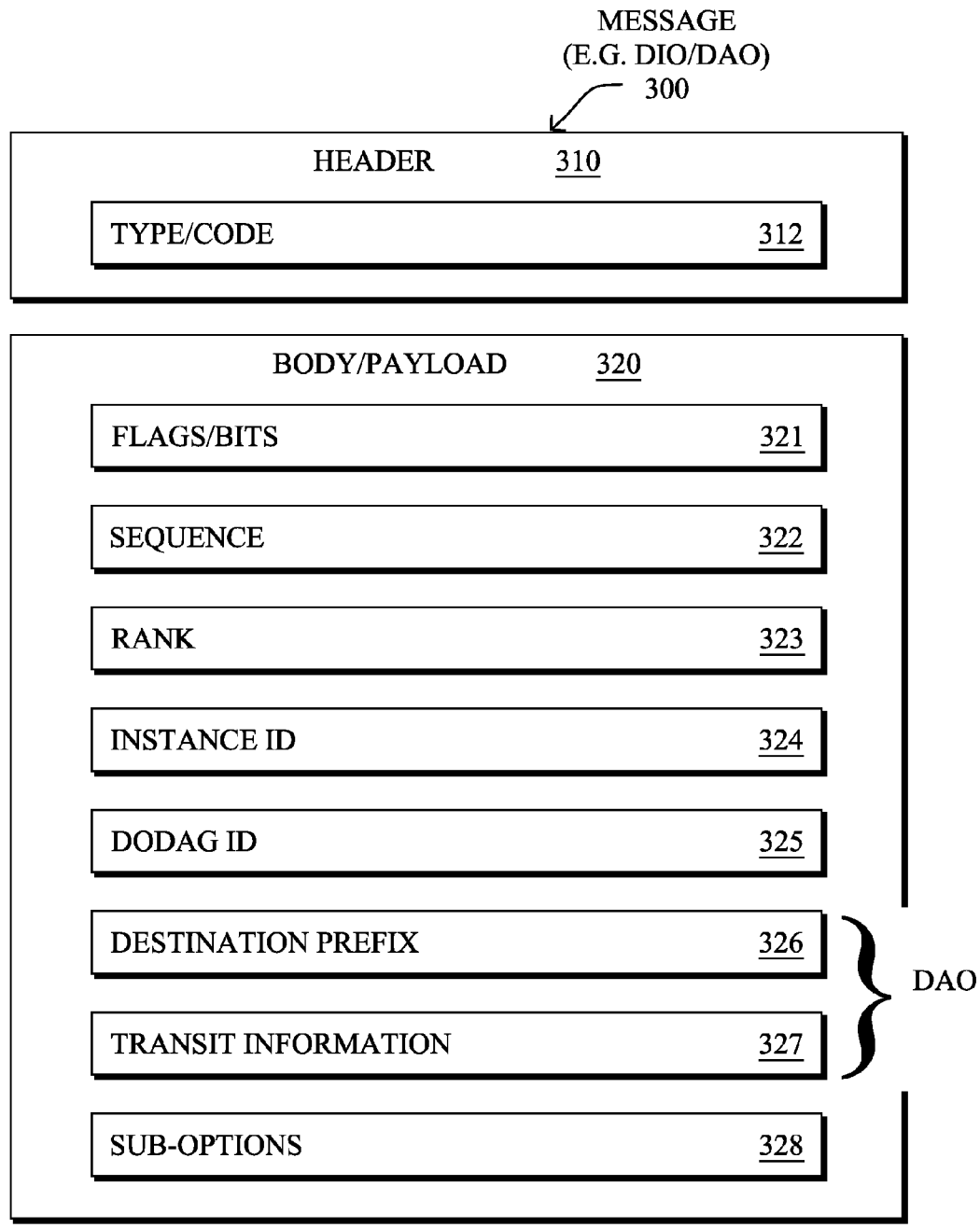
FIG. 3 illustrates an example message.

FIG. 3 illustrates an example simplified control message format 300 that may be used for discovery and route dissemination when building a DAG, e.g., as a DIO or DAO. Message 300 illustratively comprises a header 310 with one or more fields 312 that identify the type of message (e.g., a RPL control message), and a specific code indicating the specific type of message, e.g., a DIO or a DAO (or a DAG Information Solicitation). Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO Sequence used for ACKs, etc.). For either DIOs or DAOs, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, etc., as may be described herein, e.g., in one or more type-length-value (TLV) fields.

Figure 4:
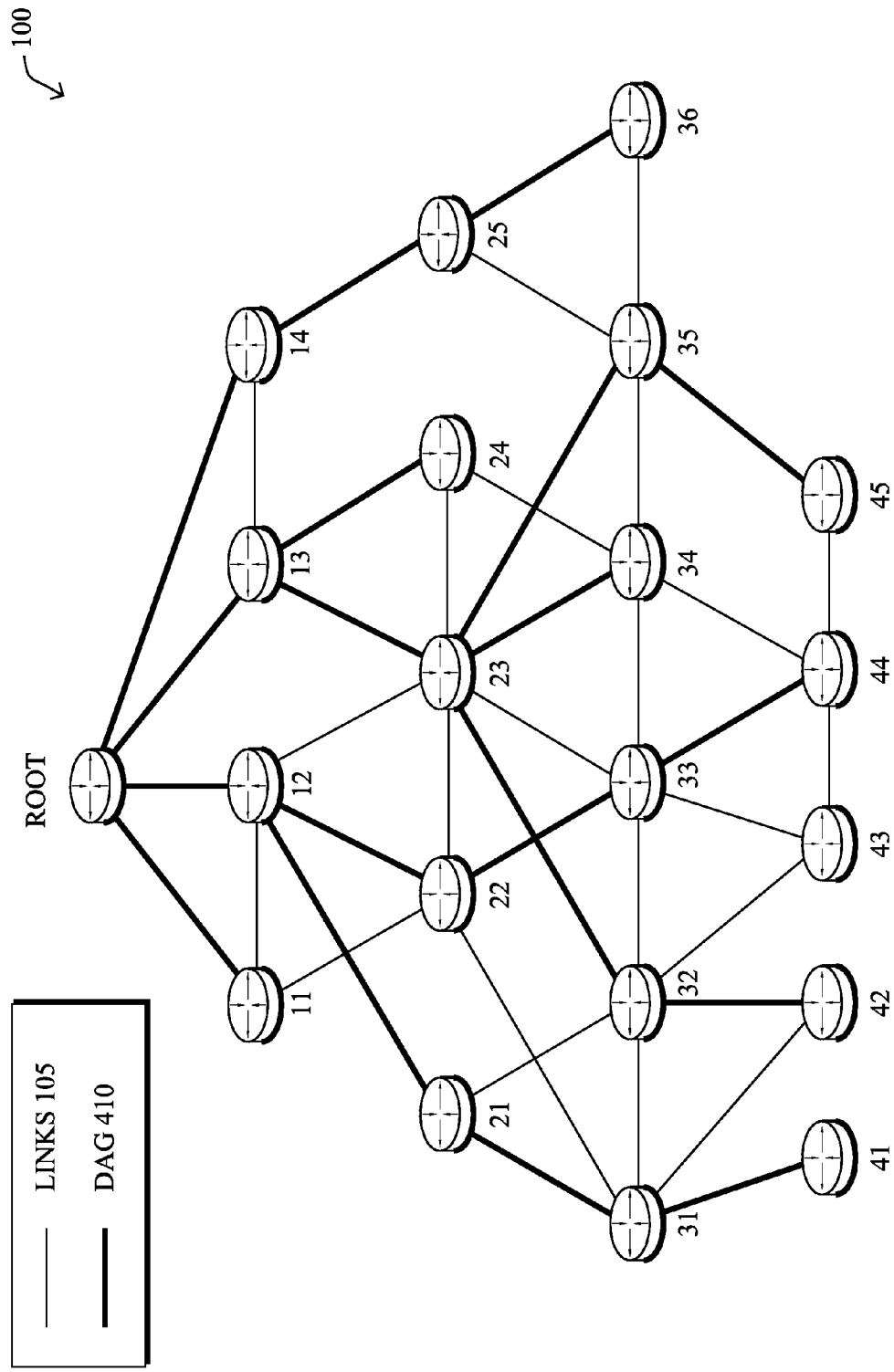
FIG. 4 illustrates an example directed acyclic graph (DAG) in the computer network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes.

As noted above, LLNs are often non-synchronized systems that are based on the assumption that nodes are free to transmit (after carrier sensing) when they have data to transmit without any synchronization. One of the major issue in LLNs, especially on non-synchronized shared media links (e.g., wireless links, etc.) is link congestion: not only is the bandwidth very limited, but it is well-known that the efficiency of data transmission collapses once the offered load exceeds some known limit. Thus congestion may lead to link collapse.

Congestion may occur in a number of circumstances, for example, congestion may occur in response to a burst of critical messages after power failure in the grid, the failure of a node or a set of links causing a DAG topology change with a large number of new children joining a node, etc., or even simply in response generally to there being too much traffic in the network.

Figure 5:
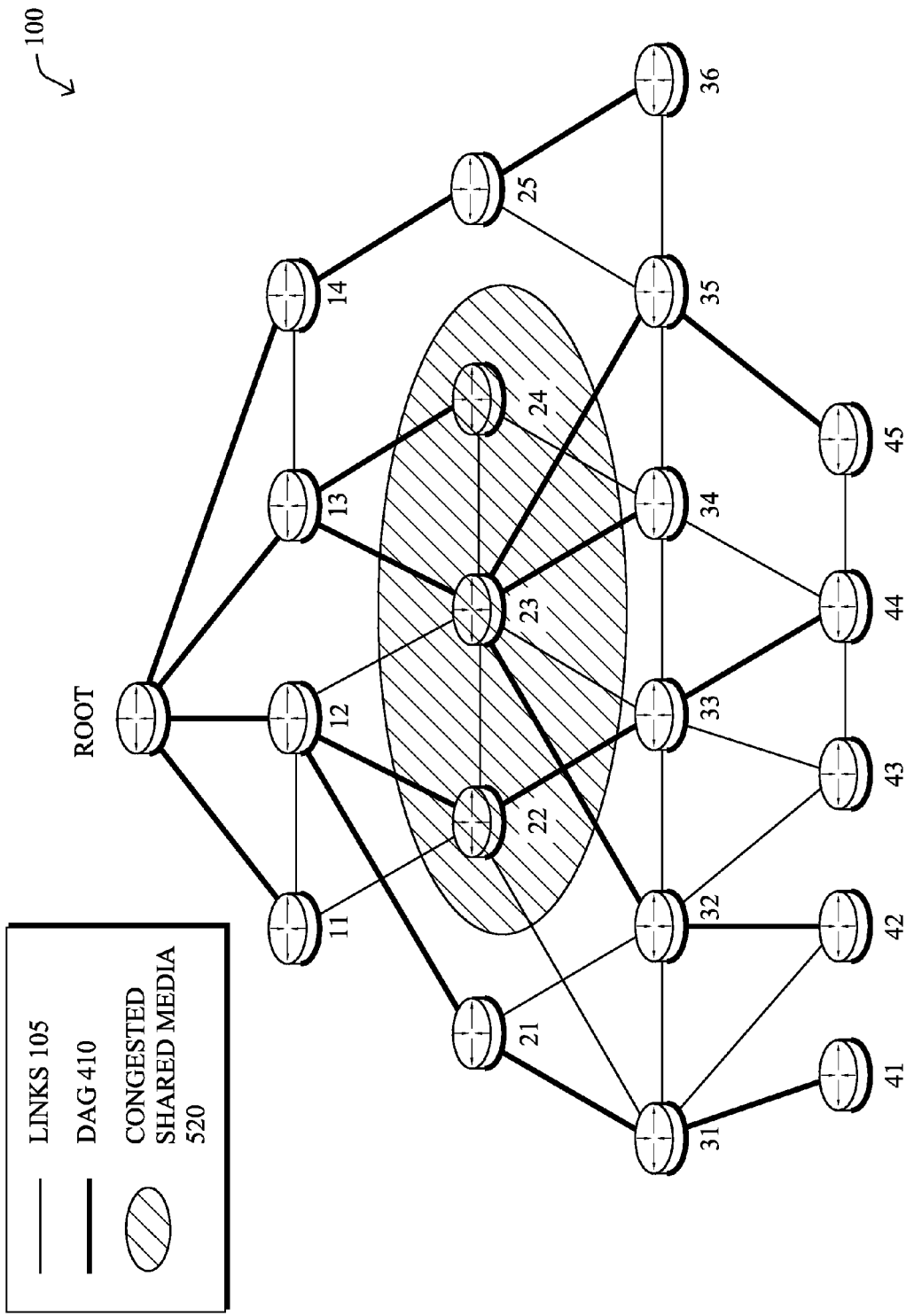
FIG. 5 illustrates an example of congestion in the network of FIG. 1.

FIG. 5 illustrates an example location of congestion (520) in the network of FIG. 1. For instance, due to the DAG shape, node 23 may have child nodes consisting of node 32, node 34, and node 35. Also, node 33, though transmitting to a different parent node (node 22), may still be located within listening range of node 23, and thus may interfere with (e.g., collide, conflict, etc.) with node 23's reception of its own child nodes' traffic. If each of these child nodes or neighbor nodes of node 23 is attempting to transmit at the same time and over the same frequency band, node 23's links may become overloaded with traffic, and node 23 may be unable to interpret the conflicting signals from its own child nodes. (Note that traffic from node 23's parent, as well as other nodes in the vicinity, may also worsen the congestion.) In this instance, once the congestion occurs, it may be exacerbated by the fact that the child nodes, experiencing lost traffic, begin to retransmit their traffic for additional attempts, further increasing the amount of traffic at this congested location 520.

Current approaches generally involve increasing the bandwidth on the links close to the congestion points (e.g., at/near DAG roots), such as adding links, supporting multiple frequencies, etc., or performing load balancing on the traffic across a set of links across multiple (e.g., diverse) paths, among other techniques. These alternatives are directed at reducing the risk of congestion, however there is no solution to handle the congestion once it occurs.

Dynamic Expelling of Child Nodes

The techniques herein propose a mechanism that allows a parent node in a DAG to send a signal to a child node to reattach somewhere else and not send any traffic to the parent node, e.g., or any of the node in the vicinity, for a period of time. Illustratively, the parent node specifically "expels" the child node, and thus its associated sub-DAG (the child node's children, grandchildren, etc.), dynamically in response to congestion at the parent node.

Specifically, according to one or more embodiments of the disclosure as described in detail below, a parent node in a DAG in a computer network may detect congestion due to traffic from its child nodes. In response, the parent node may determine particular child nodes to expel from the parent node based on the congestion, and notifies the expelled child nodes that they must detach from the parent node in response to the congestion (e.g., to find a new parent, excluding the parent node and optionally any nodes in the vicinity). In another embodiment, a child node receives a detach request packet from a current parent node that indicates that the child node is expelled from using the current parent node. In response, the child node triggers a new parent selection to select a new parent node that specifically excludes the current parent node (e.g., and optionally any nodes in the parent's vicinity).

Illustratively, the techniques described herein may be performed by hardware, software, and/or firmware, such as in accordance with DAG process 246, which may contain computer executable instructions executed by the processor 220 to perform functions relating to the novel techniques described herein, e.g., in conjunction with routing process 244. For example, the techniques herein may be treated as extensions to conventional protocols, such as the RPL protocol, and as such, would be processed by similar components understood in the art that execute the RPL protocol, accordingly.

As noted above in FIG. 5, congested shared media 520 may exist when, for example, the shared media is wireless, and nodes 32-35 try to send traffic to their preferred parent (e.g., parent node 23 for child nodes 32, 34, and 35, and parent node 22 for child node 33), thus leading to a congestion area spreading across a distance that may involve a subset of the nodes at the rank 2 (two hop depth in the DAG, i.e., nodes labeled in the 20's). Note also that as mentioned above, additional congestion factors include traffic to/from nodes 12 and 13 above node 23.

Operationally, the parent node (e.g., any parent node experiencing congestion in the network, as described herein) may compute a list V of nodes in its vicinity. For instance, a node's vicinity may be defined as any node within listening/transmitting distance from the node. To that end, a request (e.g., a packet 140, such as a RPL packet with an acknowledgment request set) may be sent by a particular parent node (e.g., node 23 in this example) using a link local multicast address, requesting for all nodes receiving the packet to reply back. In certain embodiments, the request may also indicate that the nodes that receive the request also provide their rank in the DAG. All (participating) nodes receiving that packet returns a reply to the originator.

Figure 6:
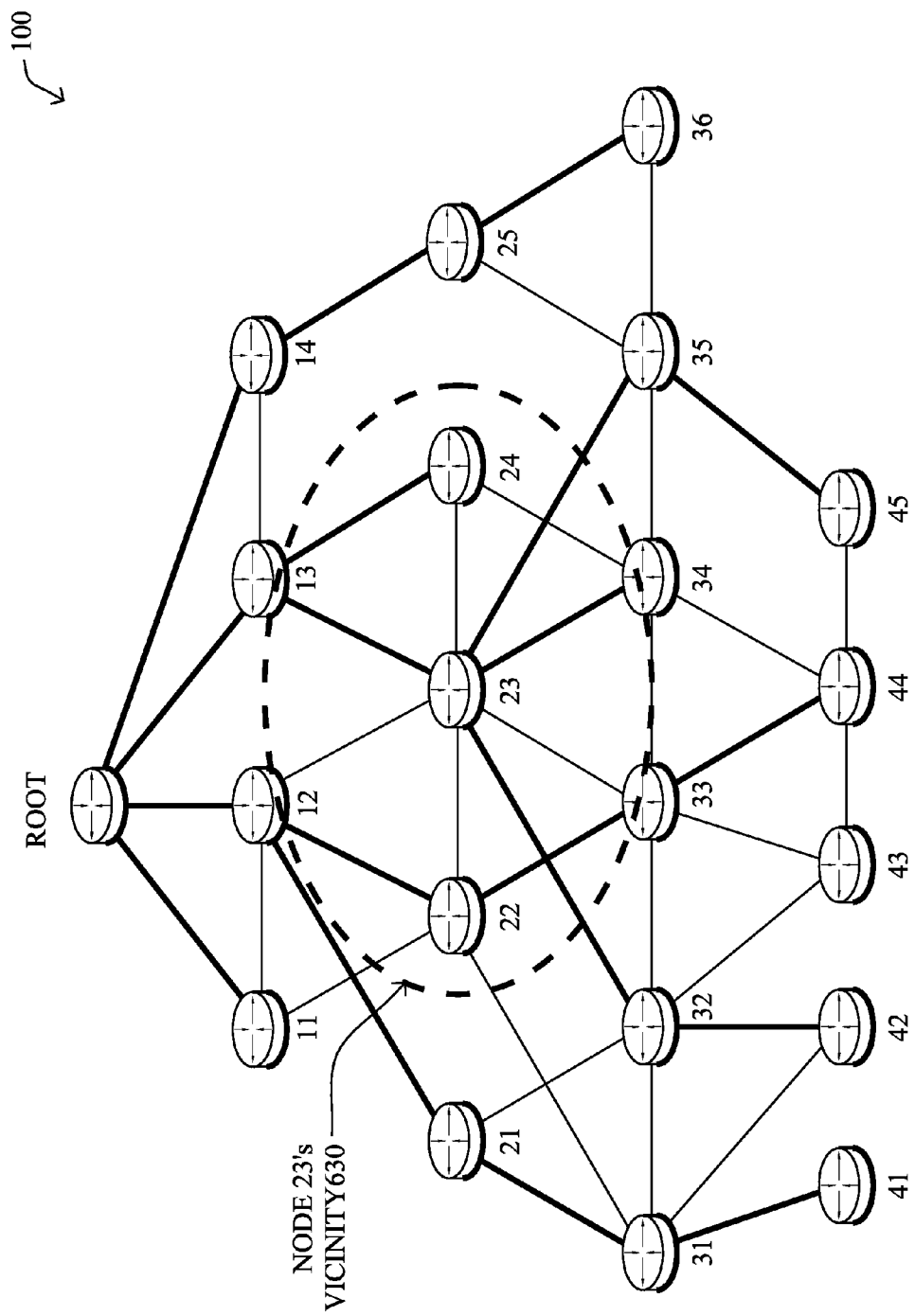
FIG. 6 illustrates an example of a node's vicinity in the network of FIG. 1.

As shown in FIG. 6, assuming that node 23 initiated the request, nodes 12, 13, 22, 24, 32, 33, 34, and 35 may reply, indicating node 23's vicinity 630 (V). In one or more embodiments, the vicinity V may be kept as all nodes within listening/transmitting distance of the parent node, though in certain embodiments, the vicinity 630 may comprise a subset V', such as based on DAG rank/depth (e.g., only those nodes within the same rank as the node, or the same rank and lower in the DAG, etc.) Note that the set V or subset V' may be determined a priori if the node (e.g., node 23) has sufficient memory to store states, or else the vicinity 630 may be identified upon congestion detection.

According to the techniques herein, a parent node (e.g., node 23) determines when a link (e.g., a shared media) is close to a critical level of congestion (called X). As mentioned above, when the link utilization approaches X, the percentage of utilization of the links greatly degrades (e.g., collapses). In certain embodiments, the link utilization measurement may be performed without the use of any low pass filter to be able to react sufficiently quickly upon network congestion. Alternatively, in certain embodiments, the measurement may use a low pass filter with a reduced "smoothing" effect. For example, a reduced smoothing effect may be represented as: New_X=0.2*Old_X+0.8*Instantaneous_X. If New_X approaches a congestion point, then the parent node may detect the congestion, accordingly.

Upon detecting congestion (520), the parent node (e.g., node 23) may then select/identify a set of child nodes sending packets (contributory to the congestion) to expel from the parent node based on the congestion. For example, the selection may be based on identifying and selecting those neighbor nodes that are most contributing to the congestion, those that have the lowest priority traffic, or other basis (e.g., random). Note that in one embodiment, the most contributory nodes may be expelled, while in other embodiments, the least contributory (as in, the nodes other than the most contributory nodes) may be expelled, thus preventing the contributory nodes (allegedly with more traffic) from having to reroute, and possibly causing congestion elsewhere in the network.

Figure 7:
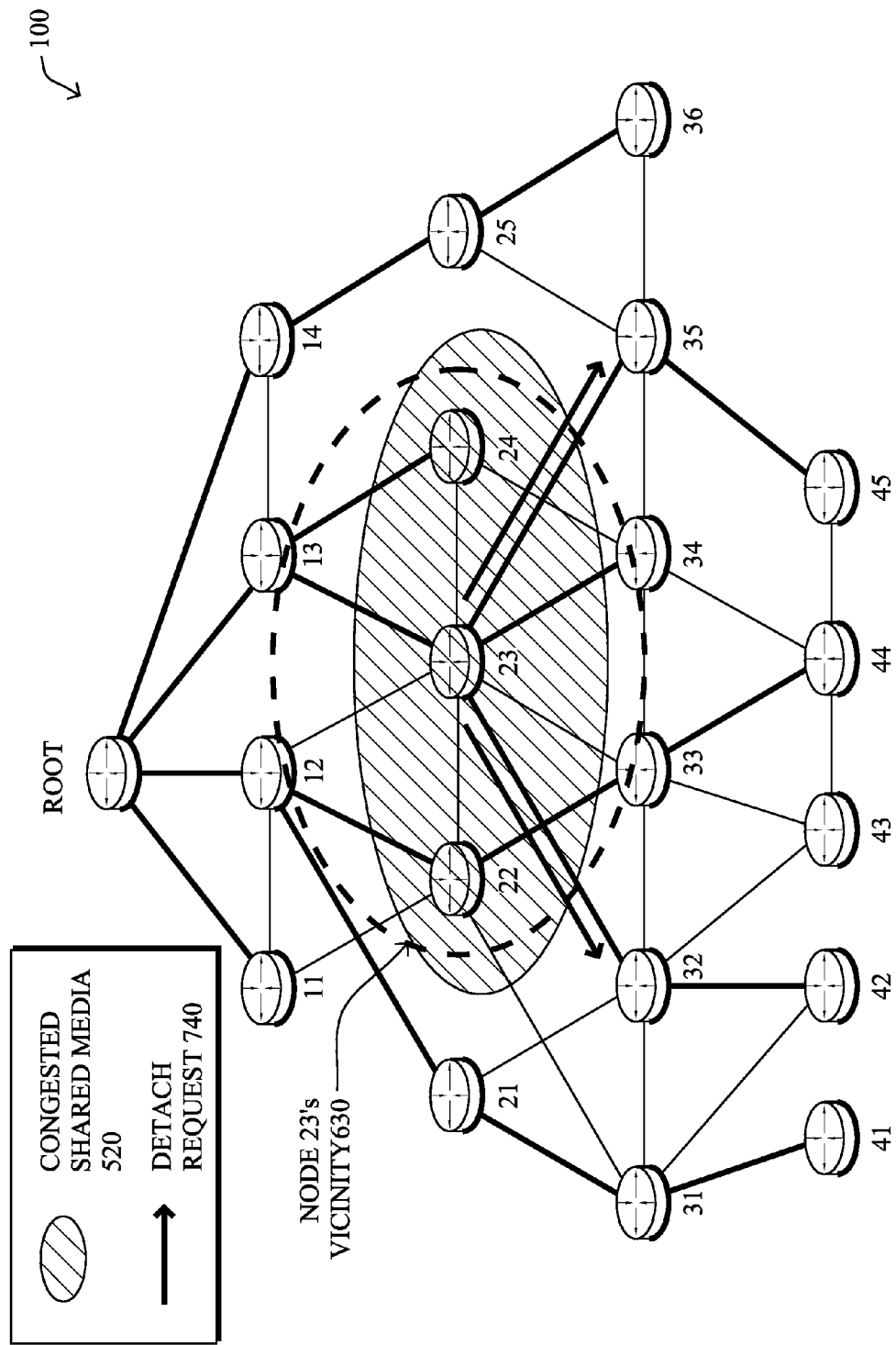
FIG. 7 illustrates an example expelling/detachment request.

The expelled child nodes may then be notified that they must detach from the parent node, such as in a unicast packet to the expelled child nodes called a "detach request" packet. The basic semantic of the detach request packet (e.g., any packet format configured to carry the information, as may be understood by those skilled in the art) is that the parent node (e.g., node 23) requests explicitly that its child node(s) choose another parent node, thus releasing traffic from the congested node (e.g., the congested area). FIG. 7 illustrates an example detach request packet 740 sent to selected child nodes 32 and 35 to be expelled, accordingly. (In certain embodiments, an acknowledgement or "ACK" for the detach request packet may also be requested by the parent node and returned by the child nodes.)

Notably, in one or more embodiments herein, to further alleviate congestion at the parent node, the expelled child node(s) may also be notified of the set of nodes V (or V') that they are also excluded from reattaching to any of the nodes in the vicinity 630 of the parent node. That is, the detach request packet 740, or else a multicast packet to all expelled nodes, may contain the set V' so that the child does not reattach to another parent in its vicinity, since otherwise, the parent node could still receive packets in its vicinity 630, which would not solve the congestion issue. For example, if the parent node 23 were to expel node 32 without including the vicinity list, node 32 could reattach at node 22. This communication could then be heard at node 23, thus node 32 has not reattached far enough away.

Note also that the parent node may set a length of time for which the expelled child nodes must remain detached. As such, the detach request packet 740 may also contain a timer T, e.g., initially set to Tmin. Further, the parent node may also clear its routing tables 245 for destinations that used to be advertised by the rejected/expelled child node. Accordingly, a notification may then be sent upstream along the DAG in the upward direction indicating the routing change.

Figure 8:
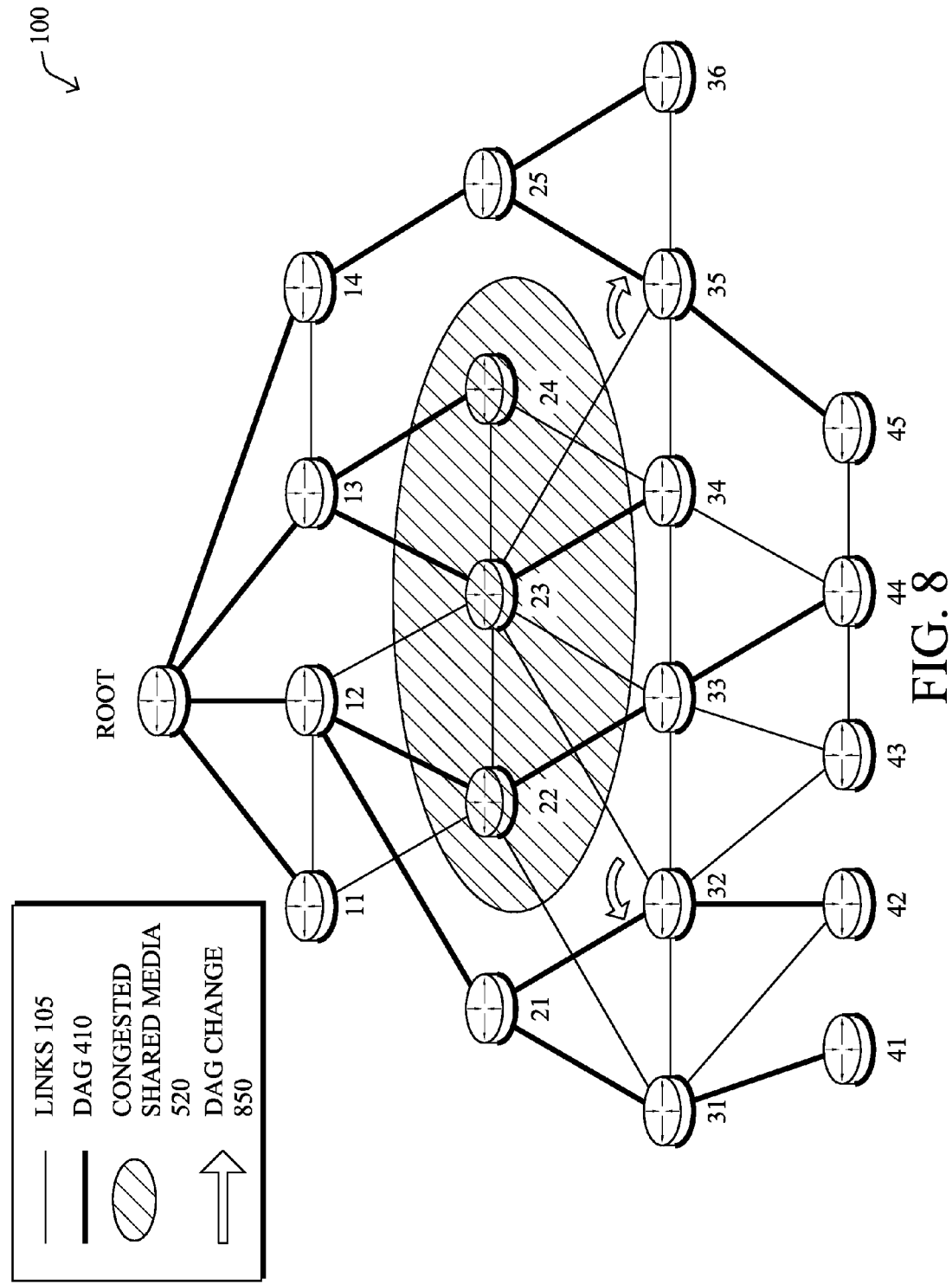
FIG. 8 illustrates an example DAG change in response to the expelling.

Upon receiving the detach request packet 740, the receiving child node triggers a new parent selection process. As shown in FIG. 8, the new parent selection process results in a DAG change 850 of the expelled child nodes (e.g., node 32 selecting parent node 21 and node 35 selecting parent node 25), explicitly excluding the current parent node (node 23). Illustratively, the new parent selection process in certain embodiments mentioned above also avoids (explicitly excludes) all nodes listed in vicinity 630 (V or V').

If a child node can find an alternate parent given the conditions above, it reattaches to that alternate parent. Note that the reattached child node may also then send an updated DIO message 300 along the DAG 410 in the downward direction (to its children) thus updating a new path cost to the root node (if needed). Accordingly, this change 850 shown in FIG. 8 may be viewed by the network as a DAG local repair.

In certain situations, no alternate parent can be found for a child node that meets the exclusions above. In these situations, the child nodes may be configured to act in a number of ways. For example, in one embodiment, the exclusions may be relaxed such that vicinity nodes (i.e., any node other than the current parent node 23) may be used as the new parent (e.g., node 32 attaching to parent node 22). Alternatively, if using a vicinity node as a new parent is not an option (e.g., not allowed to do so or not having the connectivity to a vicinity node regardless), then the expelled child node may "poison" its sub-DAG by advertising a very high, e.g., infinite, path cost, thus triggering a new parent selection for all of its own child nodes and beyond (e.g., any node using the expelled child node as an ancestor), thus alleviating the congestion by reducing its total uplink traffic.

Figure 9A:
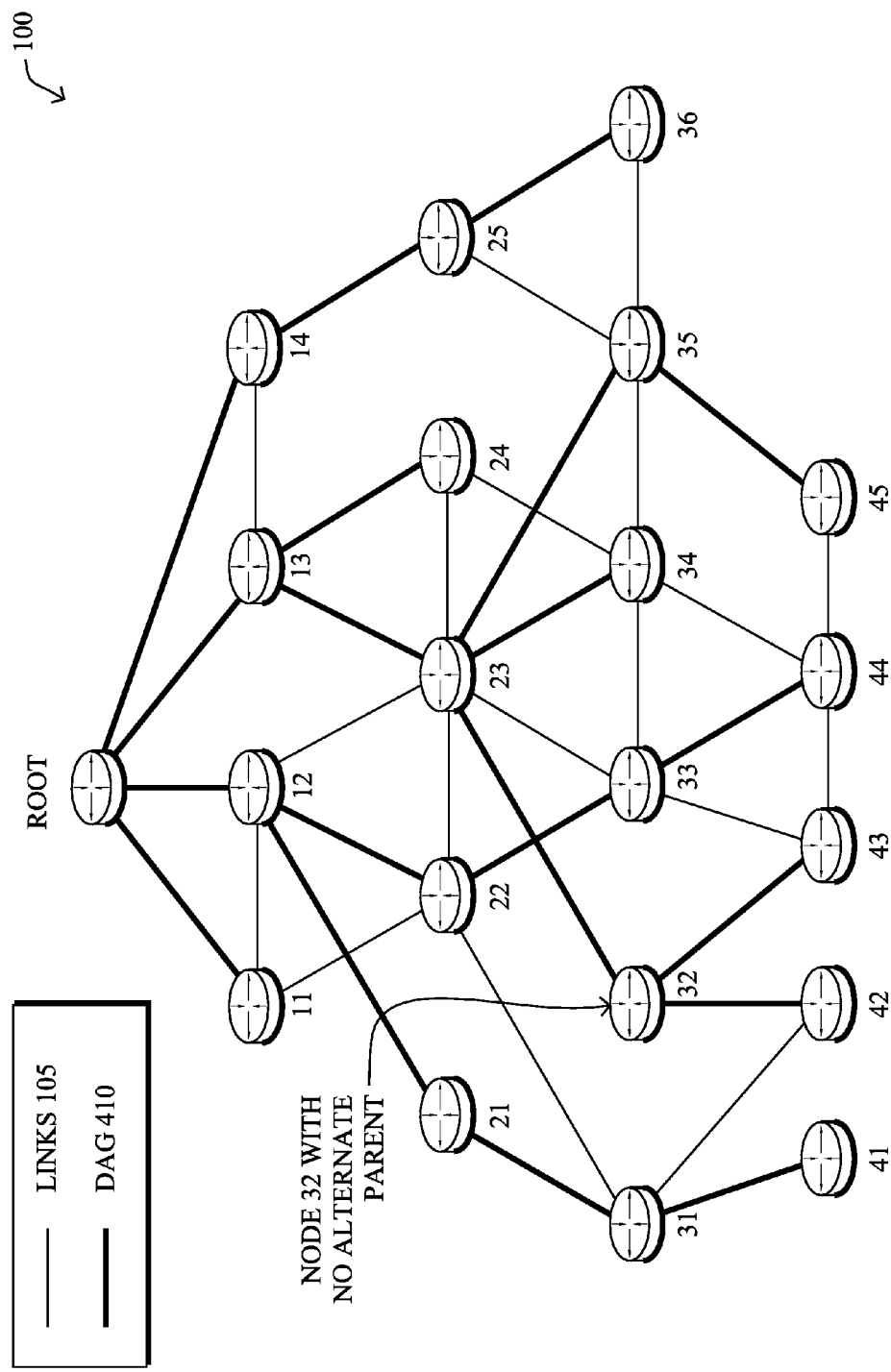
FIG. 9A-B illustrate an example of sub-DAG poisoning.
Figure 9B:
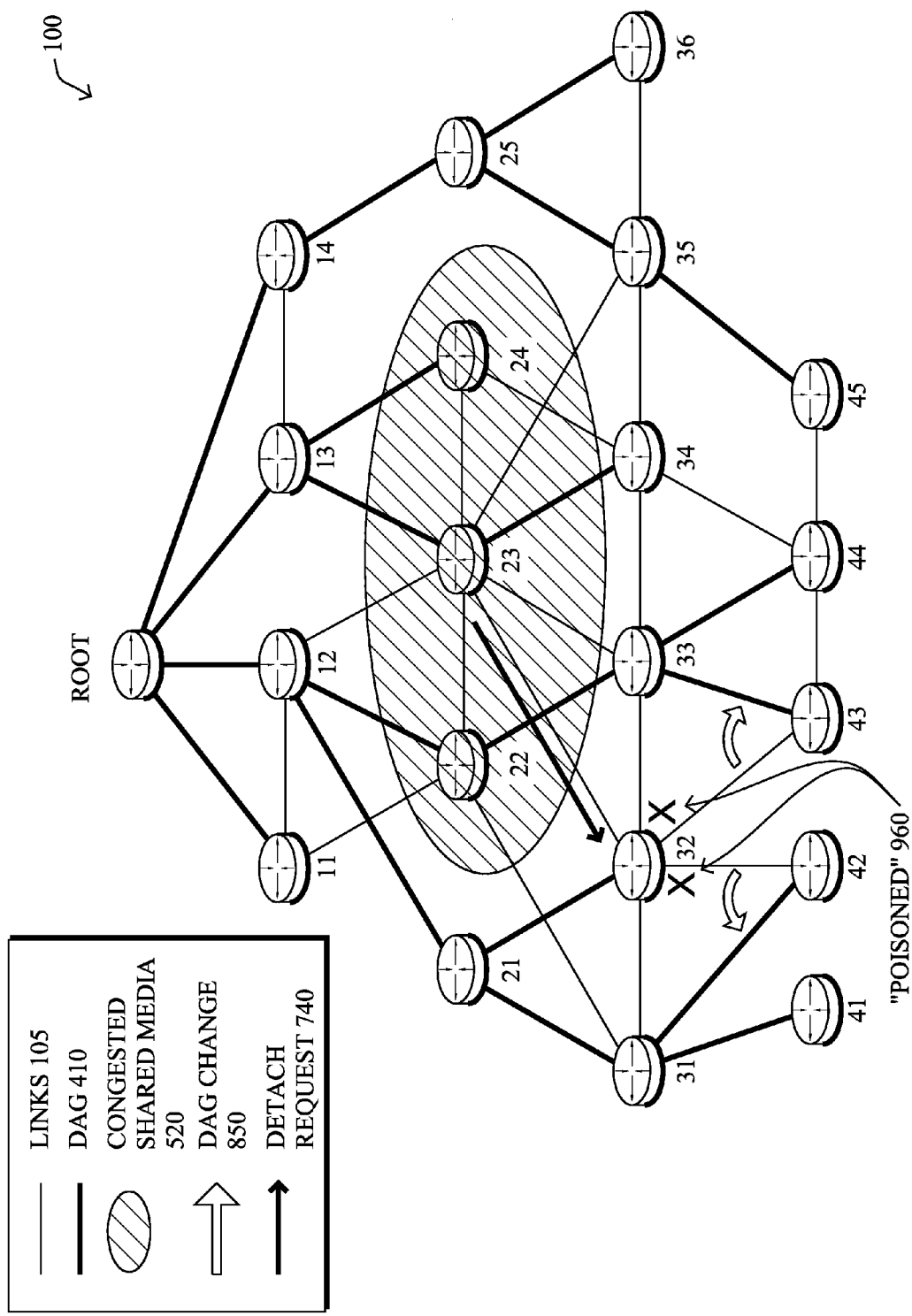

FIG. 9A illustrates a revised network topology 900, where node 32's only upward connection within the DAG is node 23, and thus node 32 has no alternate parent node (without going deeper into the DAG, that is, such as by joining node 42 and becoming a rank 5 node). If node 32 were to be expelled in this instance, then as shown in FIG. 9B, node 32 may poison (960) its sub-DAGs, so a DAG change 850 may occur below the expelled child node. Illustratively, as shown, node 42 reattaches to parent node 31, which would alleviate congestion caused by node 42 within congested area 520. However, node 43 may simply reattach to node 33, which could still contribute to the congestion. That is, while poisoning the sub-DAGs may help, it may not be an optimal solution.

Without an alternate parent, node 32 would then be forced to reattach to the current parent node 23, e.g., with an explanation that it has no alternate parent nodes (or else node 23 may operate under the assumption that a reattachment to itself indicates that fact). Optionally, upon initial parent selection, child nodes could signal to their preferred parent whether or not they have alternate parents. Such information could then be used by their preferred parents when selecting the children to whom they would expel (send the detach request message 740), should a congestion be detected. (Alternatively, if a parent receives an indication that the child node has not alternate parent, the parent node may send a second detach request, thus forcing the child node to detach even without an alternate parent, e.g., driven by the severity of the congestion, the rank of the expelled child, etc.)

Upon the expiration of the timer T (e.g., 10 seconds), each detached child node may trigger another parent selection process, potentially selecting the previous parent as its preferred parent. Alternatively, in response to detecting congestion relief, the parent node may transmit a "reattach permission" packet to one or more of the expelled child nodes (e.g., all at once, or a subset to ease back into the normal mode of operation) to instruct the expelled child nodes that they are allowed to reattach to the previous parent node that originally sent the detach request packet 740 (e.g., node 32 reselecting parent node 23). Should the node decide to reselect the same former parent, the child node may be configured to reattach after a certain delay, e.g., by adding a random timer, to avoid having all former children attempting to rejoin the previous parent node simultaneously.

If another congestion is detected before the expiration of a second timer, the process may be restarted with a longer timer, e.g., T'=2*T. Increasing this length of time for subsequent detected congestion may help alleviate greater congestion, however in certain circumstances it may be necessary (or otherwise merely desired) to adjust the set of expelled child nodes to account for the continued congestion (e.g., additional child nodes or different child nodes, etc.). Adjusting the time T and the expelled set of child nodes may occur individually at each iteration, or may be adjusted substantially simultaneously. Note that while adjusting the time/child nodes in this manner for continued congestion, once the system returns to its normal mode of operation (no exclusions for preferred parents), if after a period of time, e.g., equal to 2*current_T, no congestion occurs, the timer T may be reset to its minimum (e.g., original Tmin) value.

Note that the timer T could be set to an infinite value, meaning that the child node cannot rejoin its former preferred parent unless explicitly invited to do so (upon receiving a reattach permission packet, noted above, indicating that the node is no longer expelled/black-listed). Note that the reattach permission packet used in this manner allows the parent node experiencing the congestion to have a fine control over which former child nodes could potentially reattach, and when those particular former child nodes could potentially reattach.

Figure 10:
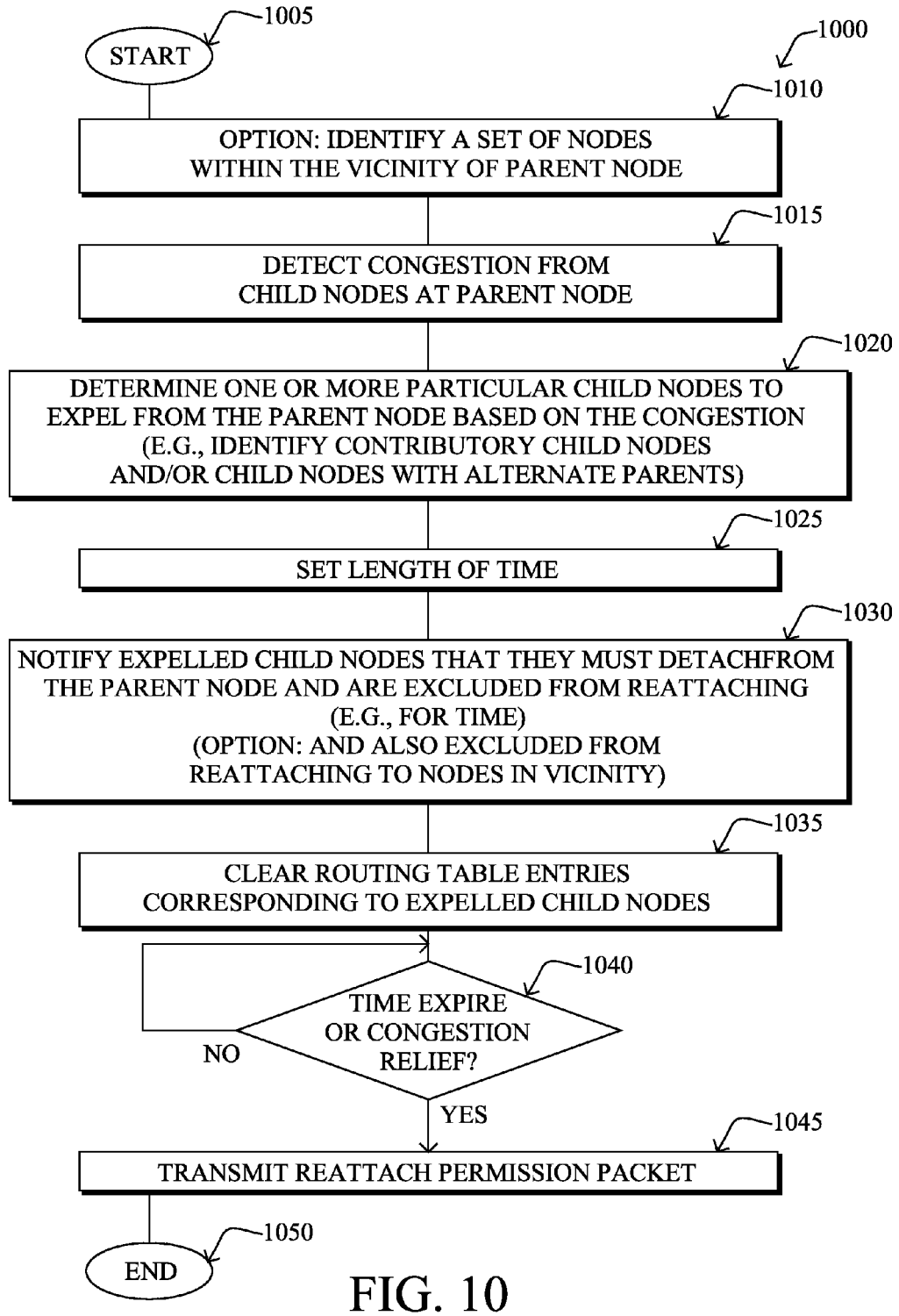
FIG. 10 illustrates an example simplified procedure for dynamically expelling DAG child nodes from a parent node from the perspective of the DAG parent node.

FIG. 10 illustrates an example simplified procedure for dynamically expelling DAG child nodes from a parent node in accordance with one or more embodiments described herein, e.g., from the perspective of the DAG parent node. The procedure 1000 starts at step 1005, and continues to step 1010, where, in certain embodiments, the parent node (e.g., node 23) may first identify a set of nodes within its vicinity, as mentioned above. If the parent node detects congestion from its child nodes in step 1015, then in step 1020 the parent node determines one or more particular child nodes to expel based on the congestion (e.g., nodes 32 and 35). For instance, as described in detail herein, the selection may be based on the traffic levels from each child node (e.g., identifying contributory child nodes), whether a child node has any alternate parents, traffic priority, congestion history, etc.

In step 1025, the parent node may set a configurable length of time, and then in step 1030 notifies (detach request 740) the expelled child nodes that they must detach from the parent node and are excluded from reattaching (e.g., for the set time). In certain embodiments as described above, the notification may also include a list of the nodes in the vicinity that should be excluded from reattachment. Additionally, the parent node may clear its routing table entries (prefixes 245) corresponding to expelled child nodes in step 1035.

In response to the set time expiring in step 1040 (e.g., where the child nodes are not informed of the set time initially), or else in response to some indication of congestion relief as noted above, then the parent node may transmit a reattach permission packet in step 1045, at which time any interested child nodes may attempt to reattach. The procedure 1000 ends in step 1050, that is, until additional congestion is detected (at which time, notably, the set time in step 1025 may be increased).

Figure 11:
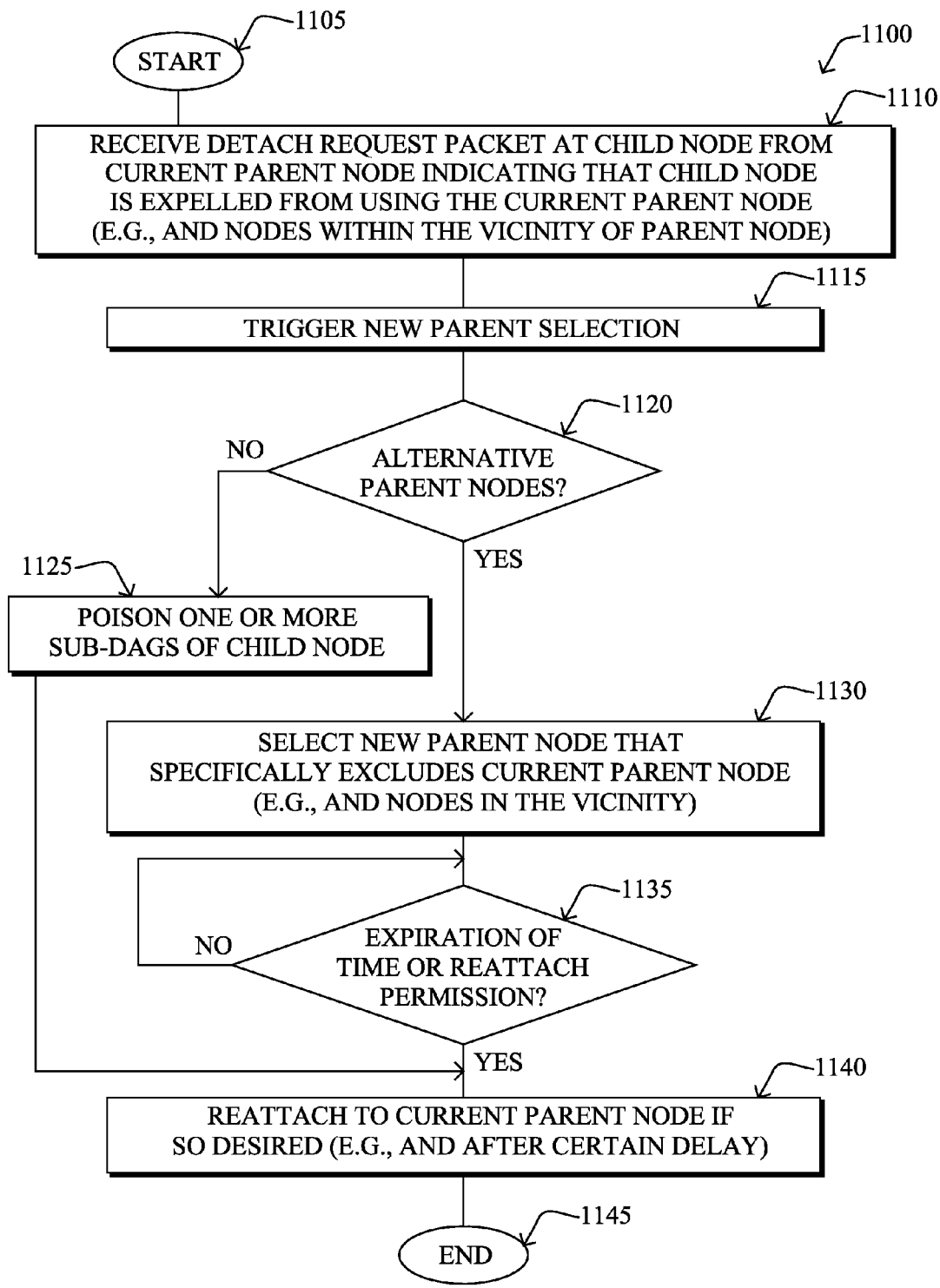
FIG. 11 illustrates an example simplified procedure for dynamically expelling DAG child nodes from a parent node from the perspective of the DAG child node.

In addition, FIG. 11 illustrates an example simplified procedure for dynamically expelling DAG child nodes from a parent node in accordance with one or more embodiments described herein, e.g., from the perspective of a DAG child node. The procedure 1100 starts at step 1105, and continues to step 1110, where the child node (e.g., node 32) receives a detach request packet 740 from a current parent node (e.g., node 23) indicating that the child node is expelled from using the current parent node. In one embodiment, the detach request packet also includes a notification of nodes within the vicinity 630 of parent node.

In response to the detach request packet 740, the child node triggers new parent selection in step 1115. In the event in step 1120 that the child node has no alternative parent nodes (e.g., FIG. 9A), then in step 1125 the child node may poison one or more of its sub-DAGs (e.g., infinite/high cost), and then attempt to reattach (or else remain attached) to the parent node in step 1140. If, on the other hand, the child node does have at least one alternate parent node in step 1120, then in step 1130 the child node may select (and attach to) a new parent node (e.g., node 21) that specifically excludes current parent node. Additionally, in one or more embodiments herein, the new parent node selection also excludes nodes in the vicinity 630 of the expelling parent node.

Upon expiration of a set time in step 1135, or else in response to a reattach permission packet, then in step 1140 the child node may, if so desired, attempt to reattach to the previous parent node. As mentioned above, to avoid the possibility of reattachment collisions, the child node may perform step 1140 after a certain, e.g., randomized, delay. The procedure 1100 ends in step 1145, until, that is, any new detach requests are received, at which time a new procedure 1100 begins at steps 1105/1110, accordingly.

The novel techniques described herein, therefore, dynamically expel DAG child nodes from a parent node in a computer network. In particular, the embodiments herein allow a parent node experiencing congestion over a shared media link to select a set of child nodes to expel by explicitly requesting a detachment, notably, in certain embodiments, while providing a set of other nodes in the vicinity that the detaching node should not reattach to. The detach request request/order may also carry a timer after the expiration of which the child is allowed to rejoin, or else an explicit invitation may be sent to indicate that expelled child nodes are allowed to rejoin the parent node. Accordingly, the techniques herein manage congestion by adaptively reshaping the DAG structure.

While there have been shown and described illustrative embodiments that dynamically expel DAG child nodes from a parent node in a computer network, it is to be understood that various other adaptations and modifications may be made within the spirit and scope of the embodiments herein. For example, the embodiments have been shown and described herein with relation to LLNs, and more particular, to the RPL protocol. However, the embodiments in their broader sense are not as limited, and may, in fact, be used with other types of networks and/or protocols utilizing DAG routing (e.g., distance vector protocols) that are susceptible to congestion. Also, while the techniques described above generally reference wireless communication, other shared media (e.g., PLC) may be used.

Furthermore, while the description above relates particularly to expelling DAG child nodes in response to congestion, the techniques herein may be used in other embodiments, such as parent node maintenance, detected interference, security measures, etc., such that the detach request packet need not be solely in response to congestion at a parent node.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    detecting congestion from a plurality of child nodes at a parent node in a directed acyclic graph (DAG) in a computer network;
    determining one or more particular child nodes most contributory to congestion or child nodes with alternate parents;
    notifying the one or more particular child nodes that the one or more particular child nodes must detach from the parent node in response to the congestion;
    and are excluded from reattaching to the parent node for a length of time that the congestion is expected to last.

2. The method as in claim 1, further comprising:
    identifying a set of nodes within a vicinity of the parent node; and
    notifying the one or more particular child nodes of the set of nodes and that the one or more particular child nodes are excluded from reattaching to any of the set of nodes in the vicinity of the parent node.

3. The method as in claim 1, wherein determining the one or more particular child nodes comprises:
    identifying a set of child nodes of the plurality of child nodes most contributory to the congestion; and
    selecting the one or more particular child nodes from the set of child nodes.

4. The method as in claim 1, further comprising:
    determining a length of time that the congestion is expected to last; and
    setting the length of time for which the one or more particular child nodes must remain detached.

5. The method as in claim 4, further comprising:
    increasing the length of time for subsequent detected congestion.

6. The method as in claim 1, further comprising:
    in response to detecting congestion relief at the parent node, transmitting a reattach permission packet to at least one of the one or more particular child nodes to instruct the at least one child node that the at least one child nodes is allowed to reattach to the parent node.

7. The method as in claim 1, wherein determining the one or more particular child nodes comprises:
    identifying a set of child nodes of the plurality of child nodes that have alternate parents; and
    selecting the one or more particular child nodes from this set of child nodes.

8. The method as in claim 1, further comprising:
    clearing parent node routing table entries corresponding to the one or more particular child nodes.

9. An apparatus, comprising:
    one or more network interfaces to communicate in a directed acyclic graph (DAG) in a computer network as a parent node;
    a processor coupled to the network interfaces and adapted to execute one or more non-transitory processes; and
    a memory configured to store a process executable by the processor, the process when executed operable to:
    detect congestion at the apparatus from a plurality of child nodes;
    determine one or more particular child nodes of the plurality of child nodes most contributory to congestion or child nodes with alternate parents;
    and notify the one or more particular child nodes that the one or more particular child nodes must detach from the apparatus as their parent node in response to the congestion;
    and are excluded from reattaching to the parent node for a length of time that the congestion is expected to last.

10. The apparatus as in claim 9, wherein the process when executed is further operable to:
    identify a set of nodes within a vicinity of the apparatus; and
    notifying the one or more particular child nodes of the set of nodes and that the one or more particular child nodes are excluded from reattaching to any of the set of nodes in the vicinity of the apparatus.

11. The apparatus as in claim 9, wherein the process when executed to determine the one or more particular child nodes is operable to:
    identify a set of child nodes of the plurality of child nodes most contributory to the congestion; and
    select the one or more particular child nodes from the set of child nodes.

12. The apparatus as in claim 9, wherein the process when executed is further operable to:
  set a length of time for which the one or more particular child nodes must remain detached.

13. The apparatus as in claim 9, wherein the process when executed is further operable to:
  detect congestion relief; and, in response,
  transmit a reattach permission packet to at least one of the one or more particular child nodes to instruct the at least one child node that the at least one child node is allowed to reattach to the apparatus as its parent node.

14. The apparatus as in claim 9, wherein the process when executed to determine the one or more particular child nodes is operable to:
  identify a set of child nodes of the plurality of child nodes that have alternate parents; and
  select the one or more particular child nodes from the set of child nodes.

15. A method, comprising:
  receiving, at a child node in a directed acyclic graph (DAG) in a computer network, a detach request packet from a current parent node of the child node, the detach request packet indicating that the child node is expelled from using the current parent node for a length of time that the congestion is expected to last;
  triggering a new parent selection in response to the detach request packet; and, in response,
  selecting a new parent node that specifically excludes the current parent node.

16. The method as in claim 15, further comprising: receiving notification of a set of nodes within a vicinity of the parent node; and
  specifically excluding the set of nodes in the vicinity of the parent node from being selected as a new parent node.

17. The method as in claim 15, further comprising:
  reattaching to the current parent node upon one of either expiration of a set length of time for which the child node must remain detached or receiving a reattach permission packet that instructs the child node that it is allowed to reattach to the current parent node.

18. The method as in claim 17, wherein reattaching comprises: reattaching to the current parent upon either of the timer expiration or the reattach permission packet after a certain delay.

19. The method as in claim 15, further comprising:
  in response to receiving the detach request packet from the current parent node, determining that the child node has no alternative parent nodes; and, in response,
  poisoning one or more sub-DAGs of the child node.

20. The method as in claim 15, wherein the received detach request packet is in response to congestion at the current parent node.

21. An apparatus, comprising: one or more network interfaces to communicate in a directed acyclic graph (DAG) in a computer network as a child node to a current parent node; a processor coupled to the network interfaces and adapted to execute one or more non-transitory processes; and
  a memory configured to store a process executable by the processor, the process when executed operable to:
  receive a detach request packet from the current parent node indicating that the apparatus is expelled from being a child node to the current parent node for a length of time that the congestion is expected to last;
  trigger a new parent selection in response to the detach request packet; and select a new parent node that specifically excludes the current parent node in response to the detach request packet.

22. The apparatus as in claim 21, wherein the process when executed is further operable to:
  receive notification of a set of nodes within a vicinity of the parent node; and
  specifically exclude the set of nodes in the vicinity of the parent node from being selected as a new parent node.

23. The apparatus as in claim 21, wherein the process when executed is further operable to:
  reattach to the current parent node upon one of either expiration of a set length of time for which the apparatus must remain detached or receiving a reattach permission packet that instructs the apparatus that it is allowed to reattach to the current parent node.

24. The apparatus as in claim 21, wherein the process when executed is further operable to:
  determine that the apparatus has no alternative parent nodes in response to receiving the detach request packet from the current parent node; and, in response,
  poison one or more sub-DAGs of the apparatus for which the apparatus is a parent node.

* * * * *

UNITED STATES PATENT AND TRADEMARK OFFICE
CERTIFICATE OF CORRECTION

PATENT NO. : 8,503,309 B2
APPLICATION NO. : 12/971422
DATED : August 6, 2013
INVENTOR(S) : Jean-Philippe Vasseur et al.

Page 1 of 1

It is certified that error appears in the above-identified patent and that said Letters Patent is hereby corrected as shown below:

In the Specification

Column 6, line 60, please amend as shown:

tination[[ is]] information upwards along the DODAG so that a

Column 12, line 23, please amend as shown:

In certain[[ to]] embodiments as described above, the notification

Signed and Sealed this
Tenth Day of June, 2014

Michelle K. Lee
*Deputy Director of the United States Patent and Trademark Office*